Jan. 3, 1939.  C. F. MUTTER  2,142,328

SAFETY DEVICE FOR AUTOMOBILES

Filed Feb. 17, 1938

INVENTOR
C. F. MUTTER
BY *F. Ledermann*
ATTORNEY

Patented Jan. 3, 1939

2,142,328

UNITED STATES PATENT OFFICE 2,142,328

SAFETY DEVICE FOR AUTOMOBILES

Charles F. Mutter, Brooklyn, N. Y.

Application February 17, 1938, Serial No. 191,094

2 Claims. (Cl. 293—55)

The main object of this invention is to provide a shock-absorbing bumper for automobiles of all types, whereby upon collision of the vehicle with another vehicle or a stationary object, the vehicle will come to a gradually diminishing stop with a minimum of shock to the vehicle and to the passengers therein as well as the vehicle or object collided with.

The above and other objects will become apparent in the description below in which characters of reference refer to like-named parts in the accompanying drawing.

Referring briefly to the drawing, Figure 1 is a plan view, partly in section, of the device applied to an automobile.

Figure 1:
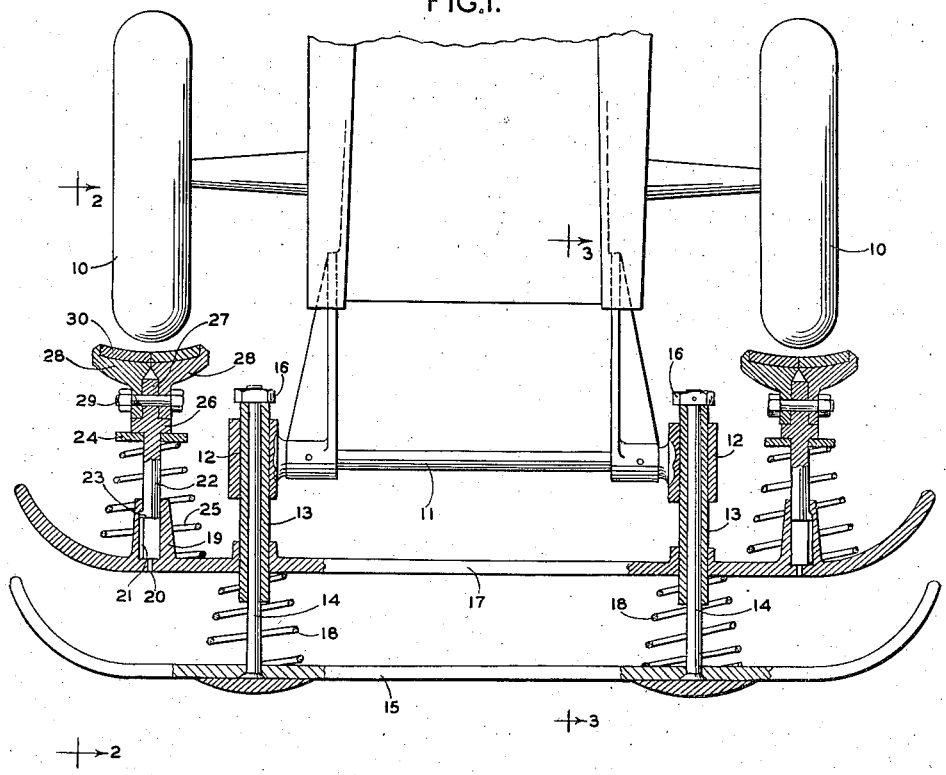
Figure 3:
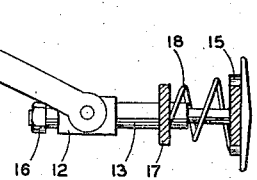
Figure 3 is a cross-sectional view taken on the line 3—3 of Figure 1.
Figure 2:
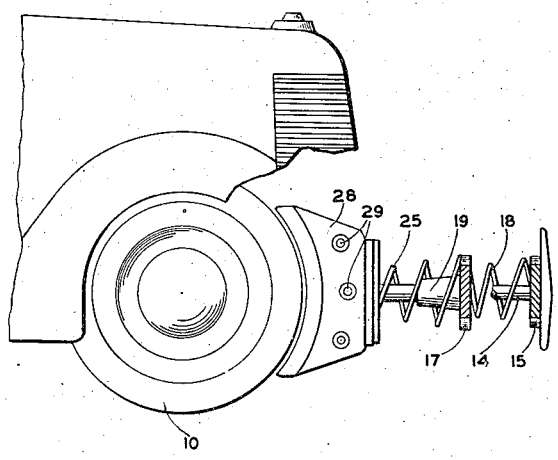
Figure 2 is a cross-sectional view taken on the line 2—2 of Figure 1.

Referring in detail to the drawing, the numeral 10 indicates the front wheels of the vehicle, and the numeral 11 the cross-bar at the front of the chassis, to which the bumper is usually attached. A sleeve 12 is rigid on each end of the bar 11 at right angles thereto, and a tube 13 is slidably mounted therein. A front bumper 15 is rigidly secured on the ends of studs 14, the latter being slidably mounted in the tubes 13. Nuts or the like 16 on the inner ends of the studs 14 serve as limit stops in a forward direction of the studs 14 and tubes 13.

An intermediate bumper 17 is secured to the tubes 13 by having the latter pass therethrough and rigidly keyed thereto, so that the bumper 17 will move back and forth with the tubes 13. Coiled springs 18 surround the studs 14 and the ends of the tubes 13 between the two bumpers, so that the front bumper 15 is normally extended at the maximum distance forward of the intermediate bumper 17. It is thus apparent that, when the vehicle strikes an obstacle, the front bumper 15 will be urged rearward against the springs 18, the studs 14 sliding a distance rearward through their tubes 13. When the springs 18 have become sufficiently compressed, further pressure against them by the bumper 15 will compel the springs 18 to urge the intermediate bumper 17 rearward and carry the tubes 13 with them.

Figure 4:
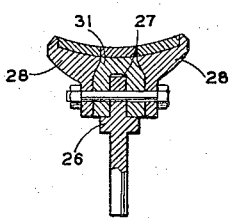
Figure 4 is a view, similar to that of Figure 1, of a modified brake shoe.

On each side of the bumper 17, near its ends, a hollow, rearwardly-extended boss 19 is formed, having a vent opening 20 extending through the bumper and an internal keyway 21. A stud 22 is slidably mounted in the opening through the boss 19 and is provided with a key 23 registering in the keyway 21. A flange or washer 24 is rigid near the other end of the stud 22, and a coiled spring 25 surrounds the stud 22 and boss 19 between the washer 24 and bumper 17, normally urging the washer end of the stud 22 rearward. Beyond the washer 24, the stud 22 is widened into a plate 26 having a vertical tongue 27, flat-surfaced on both sides, extending from the plate 26. An opening passes horizontally through the tongue 27. A pair of brake shoe wings 28 are clamped against the plate 27 by means of a bolt 29, each wing 28 having a rounded groove in which a brake lining or other layer of braking surface 30 is set in any desirable manner. If it should be desired to widen the brake, to adapt the device horizontally to wider tires, this may be done as follows. The two wings 28 are taken off by removing the bolt 29, and a center member 31 whose front is also rounded like the fronts of the wings 28 and whose rear is slotted to accommodate the tongue 27, is mounted on the tongue as shown in Figure 4, the slotted back having an opening through which the bolt 29 is then passed, after the two wings 28 have also been remounted. Thus, the breaking surface is widened.

When the intermediate bumper 17 is moved rearward, as above mentioned, through a sufficient distance, the brakes strike the wheels 10 and further movement causes application of the brakes to the wheels, through the springs 25, to brake the vehicle gradually yet rapidly and effectively.

Obviously modifications in form and structure may be made without departing from the spirit or scope of the invention.

I claim:

1. A pair of spaced-apart substantially parallel bumpers slidably mounted on a vehicle and slidable with respect to each other, coiled springs normally urging the outer of said bumpers forward from the other, brake studs slidably mounted on the inner of said bumpers and extending rearward thereof, brakes on the ends of said studs and lying adjacent the front wheels of the vehicle, and coiled springs normally urging said brakes and studs rearward of said inner bumper.

2. A pair of spaced-apart substantially parallel bumpers slidably mounted on a vehicle and slidable with respect to each other, coiled springs normally urging the outer of said bumpers forward from the other, brake studs slidably mounted on the inner of said bumpers and extending rearward thereof, brakes on the ends of said studs lying adjacent the front wheels of the vehicle, coiled springs normally urging said brakes and studs rearward of said inner bumper, and means for widening the shoes of said brakes.

CHARLES F. MUTTER.